United States Patent [19]

Duke et al.

[11] Patent Number: 4,500,954
[45] Date of Patent: Feb. 19, 1985

[54] CACHE BYPASS SYSTEM WITH POST-BLOCK TRANSFER DIRECTORY EXAMINATIONS FOR UPDATING CACHE AND/OR MAINTAINING BYPASS

[75] Inventors: Alan H. Duke; Michael H. Hartung; Frederick J. Marschner, all of Pima County, Ariz.; Kenneth P. Nolan, Boulder County, Colo.

[73] Assignee: International Business Machines Corporation, Armonk, N.Y.

[21] Appl. No.: 311,570

[22] Filed: Oct. 15, 1981

[51] Int. Cl.³ .......................... G06F 9/06; G06F 13/00
[52] U.S. Cl. .................................................. 364/200
[58] Field of Search ........ 364/200 MS FILE, 900 MS FILE

[56] References Cited

U.S. PATENT DOCUMENTS

| 4,075,686 | 2/1978 | Calle et al. ............ 364/200 |
| 4,084,234 | 4/1978 | Calle et al. ............ 364/200 |
| 4,394,733 | 7/1983 | Swenson ............... 364/200 |
| 4,398,243 | 8/1983 | Holberger et al. ..... 364/200 |
| 4,407,016 | 9/1983 | Bayliss et al. ......... 364/200 |
| 4,429,363 | 1/1984 | Duke et al. ............ 364/200 |
| 4,430,701 | 2/1984 | Christian et al. ...... 364/200 |
| 4,445,176 | 4/1984 | Burk et al. ............ 364/200 |
| 4,445,177 | 4/1984 | Bratt et al. ............ 364/200 |
| 4,466,059 | 8/1984 | Bastian et al. ......... 364/200 |

OTHER PUBLICATIONS

IBM System/360 and System/370 I/O Interface Channel to Control Unit Original Equipment Manufacturers' Information, IBM Publication GA 22-6974-4, pp. 7-8, 13-14, 19-24, Fifth Edition (1978).

Primary Examiner—James D. Thomas
Assistant Examiner—A. E. Williams, Jr.
Attorney, Agent, or Firm—H. F. Somermeyer

[57] ABSTRACT

A storage hierarchy has a caching buffer and a backing store; the backing store preferably having disk-type data-storage apparatus. A directory indicates data stored in the caching buffer. Upon a data-storage access, read or write, within a series of such accesses, resulting in a cache miss, all subsequent data storage accesses in the series are made to the backing store to the exclusion of the caching buffer even though the caching buffer has storage space allocated for such a data transfer. Selected limits are placed on the series to the backing store, such as receiving on end of series (end of command chain) indication from a using unit, crossing DASD cylinder boundaries, receiving an out of bounds address or receiving certain device oriented commands.

16 Claims, 3 Drawing Figures

CACHE BYPASS SYSTEM WITH POST-BLOCK TRANSFER DIRECTORY EXAMINATIONS FOR UPDATING CACHE AND/OR MAINTAINING BYPASS

FIELD OF THE INVENTION

The present invention relates to multilevel storage hierarchies, more particularly to the control thereof with respect to data resident in upper levels of the hierarchies.

BACKGROUND OF THE INVENTION

Peripheral storage hierarchies have been used for years for providing an apparent store as suggested by Eden, et al in U.S. Pat. No. 3,569,938. Eden, et al teach that in a demand paging or request system, caching data in a cache-type high-speed front store (buffer) can make a peripheral storage system appear to have a large capacity, yet provide rapid access to data; rapid access being faster than that provided to the normal backing store. Eden, et al also teach that the backing store can be a retentive store, such as magnetic tape recorders and magnetic disk recorders while the front store can be a volatile store such as a magnetic core store. With the advances in data storage technology, the front store typically includes semiconductive type data storage elements. U.S. Pat. No. 3,839,704 shows another form of the storage hierarchy. An important aspect of storage hierarchies is data integrity. That is, the data received from a user, such as a central processing unit (CPU) or other data handling device, should be returned to the supplying unit either correct or with an indication that errors may exist. It is typical practice in storage hierarchies to move data from a higher level to a lower level for such retentive storage as well as limiting the data in the higher levels such that other data can be stored for rapid access. U.S. Pat. No. 4,020,466 shows copying changes from a highlevel store to a backing store, while U.S. Pat. No. 4,077,059 shows forcing copyback under predetermined conditions. Such copyback operations can consume storage hierarchy performance time, i.e., so much data may be copied back that access to the data by a using unit may be degraded. This problem is partially solved by U.S. Pat. No. 3,588,839 which teaches that the only data that need be copied back from a high-level storage unit to a low-level storage is that data that is altered, i.e., where there is noncongruence between data in a backing store and data in a front store.

Storage hierarchies have taken diverse forms. For example, in accordance with the Eden, et al U.S. Pat. No. 3,569,938 a single high-speed store serviced several users. U.S. Pat. No. 3,735,360 shows that each processor can have its own high-speed store or cache for different performance reasons. Performance of the storage hierarchies also is affected by the algorithms and other controls used to place predetermined data into the cache or high-speed storage portion. Accordingly, U.S. Pat. No. 3,898,624 shows that varying the time of fetching data from a backing store to a front or caching store can be selected by computer operator in accordance with the programs being executed in a using CPU. In this manner, it is hoped that the data resident in the cache or upper level of the hierarchy will be that data needed by the CPU while excess data not needed is not resident. This arrangement allows more useful data to be stored in the higher level storage portion. All of these operations become quite intricate. Accordingly, evaluation programs for storage hierarchies have been used to evaluate how best to manage a storage hierarchy. U.S. Pat. Nos. 3,964,028 and 4,068,304 show performance monitoring of storage hierarchies for achieving these goals. Even at that, much remains to be done in various types of storage hierarchies for enhancing optimum performance while ensuring data integrity. Much of the work with respect to storage hierarchies has occurred in the cache and main memory combinations connected to a using CPU. The principles and teachings from a cached main memory relate directly to caching and buffering peripheral systems, as originally suggested by Eden et al, supra. Of course, main memory has been used prior to Eden, et al for buffering or caching data from a magnetic tape and disk unit for a CPU, i.e., a main memory was not only used as a CPU working store but also as a buffer for peripheral devices.

The performance monitoring referred to above has indicated that it is not always in the best interest of total data processing performance and integrity to always use a caching buffer interposed between a using unit and a backing store. For example, U.S. Pat. No. 4,075,686 teaches that a cache can be turned on and off by special instructions for bypassing the cache. Further, the backing store or memory was segmented into various devices with some of the devices or segments being bypassed, such as for serial or sequential input/output operations. This patent further teaches that for certain commands, it is more desirable to not use cache than to use cache. U.S. Pat. No. 4,268,907 further teaches that for a command specifying the fetching of data words, an indicator flag is set to a predetermined state. Such flag conditions replacement circuits to respond to subsequent predetermined commands to bypass cache storage for subsequently fetched data words when the indicator flag is in the predetermined state to prevent replacement of extensive numbers of data instructions already stored in cache during the execution of such instructions. Further U.S. Pat. No. 4,189,770 shows bypassing cache for operands but using cache for storing instructions.

Disk storage apparatus, also referred to as direct access storage devices (DASD), provide large quantities of random access nonvolatile storage for data processing. Caching the DASD, as suggested above, provides a storage hierarchy with the performance and throughput capability better than that of DASD; it also reduces the cost of data storage, power requirements, and increasing volumetric storage efficiency. Such performance improvement is obtained principally by maximizing the number of data storage accesses which can be satisfied by accessing a copy of the data in the cache rather than by directly accessing the DASD. Management of the storage hierarchy includes dynamically entering data into and deleting data from the cache with the intent of increasing the proportion of the number of accesses that can be satisfied through the cache. Some commands to DASD require access to the device irrespective of whether or not a cache is present. Such commands include read IPL, write home address, write R0 and write COUNT KEY DATA. On DASDs manufactured by International Business Machines Corporation, Armonk, N.Y., on such device related commands, the user accesses the DASD, obtains synchronization with the disk rotation (called orientation) and then operates directly with the DASD. When caching is used, some commands such as SEARCH, and so forth, that normally require rotational orientation of the DASD record surfaces with respect to the request can be handled by searching the cache and proceeding as if the cache were the DASD, thereby enhancing performance. It should be noted that hosts have been programmed to optimize accesses to DASD by constructing programs that accommodate DASD head seeks and latency characteristics. The present invention takes advantage of this fact each time a cache miss occurs. Otherwise, the time required to locate allocation space in cache, particularly where a large multi-megabyte cache is employed, requires sufficient time that in high performance DASDs, orientation may be lost during the search. Therefore, rather than enhancing performance, performance of the DASD can actually degrade through the addition of a cache. The present invention ensures total performance enhancement. For multitrack commands, the chain of commands is sensitive to the current relative position of the read/write mechanism with respect to the records. Since the command must be processed against a so-called home address, record zero or record one of an adjacently addressed or next track where orientation sensitivities occur, a penalty in time lost occurs when orientation is lost and is needed. This loss of time is equal to the latency period of the DASD. Therefore, in a multitrack operation two rotations of the DASD disk could be required under certain operating conditions when cache directories are searched for data images or replications stored in cache.

A so-called SEEK HEAD, i.e., a command which causes electronic switching between transducers in a multidisk DASD, is also sensitive to the current position of the read/write mechanism with respect to the rotation disks. Present input/output command chains and the data being accessed on the DASD have been structured in a way that depends upon rotational orientation with the next accessed track in the amount of time no greater than some fixed values, that is there is rotational offset of the data on the disks which allows electronic track switching without loss of rotational orientation. This fixed value of elapsed time has been determined from known device characteristics and is usually close to the time required by noncached DASD to perform the switching operation. Because of the operational characteristics of the peripheral system in a multitrack operation, such loss of time can be magnified because of other operations being performed requiring repeated attempted accesses in a multitrack operation. Accordingly, it is desired to provide a cached DASD which operates in a manner for preventing exposures to loss of orientation while maintaining high data integrity.

SUMMARY OF THE INVENTION

It is an object of the invention to provide a cached peripheral subsystem in which the interaction of a peripheral device and a caching buffer (cache) is optimized for integrity and performance. In accordance with the invention, a buffered peripheral system having a plurality of peripheral devices connected to and sharing a caching data buffer which is accessible via a directory means and which includes indications of whether or not cache buffer space is allocated to a given addressable portion of any peripheral device. In a data transfer between the buffered peripheral system and a using unit, the directory means are first examined to ascertain whether or not the caching buffer has space allocated relating to a data transfer just being initiated. If such space is allocated, then the data transfer occurs between the data buffer and the using unit. If the data buffer has no space allocated, then the data transfer is initiated directly with the peripheral device. Following any data transfer which requires access to the device, a series of data transfers chained to such data transfers operates continuously with the peripheral device even though space is allocated in the caching buffer for any data transferred in such subsequent chained data transfers.

In a specific version of the invention, the peripheral device is a disk storage apparatus having addressable cylinders of data, each cylinder having a set of tracks on respective disk record surfaces. The invention further includes limiting the chain of data signals to a cylinder; upon accessing a different cylinder, the caching buffer is again accessed to determine whether or not buffer space is allocated.

In a further refinement of the buffered peripheral system, it is possible to pin data to the cache buffer. In accordance with the invention, following completion of any chain of data transfers, the caching buffer is examined to see if any data transfer to a peripheral device related to any pinned data; upon any coincidence of such data transfer to a peripheral device, then the updated record on the device is transferred to the caching buffer to ensure congruence between the pinned data in the caching buffer and the data in the disk storage apparatus. When the DASD stored data is updated while the corresponding replication of this data stored in cache is not updated, then rather than update the cache stored, but unbound, data, such cache stored data is invalidated, i.e., effectively erased by removing addressability.

The foregoing and other objects, features, and advantages of the invention will be apparent from the following more particular description of the preferred embodiments of the invention, as illustrated in the accompanying drawings.

DETAILED DESCRIPTION

Figure 1:
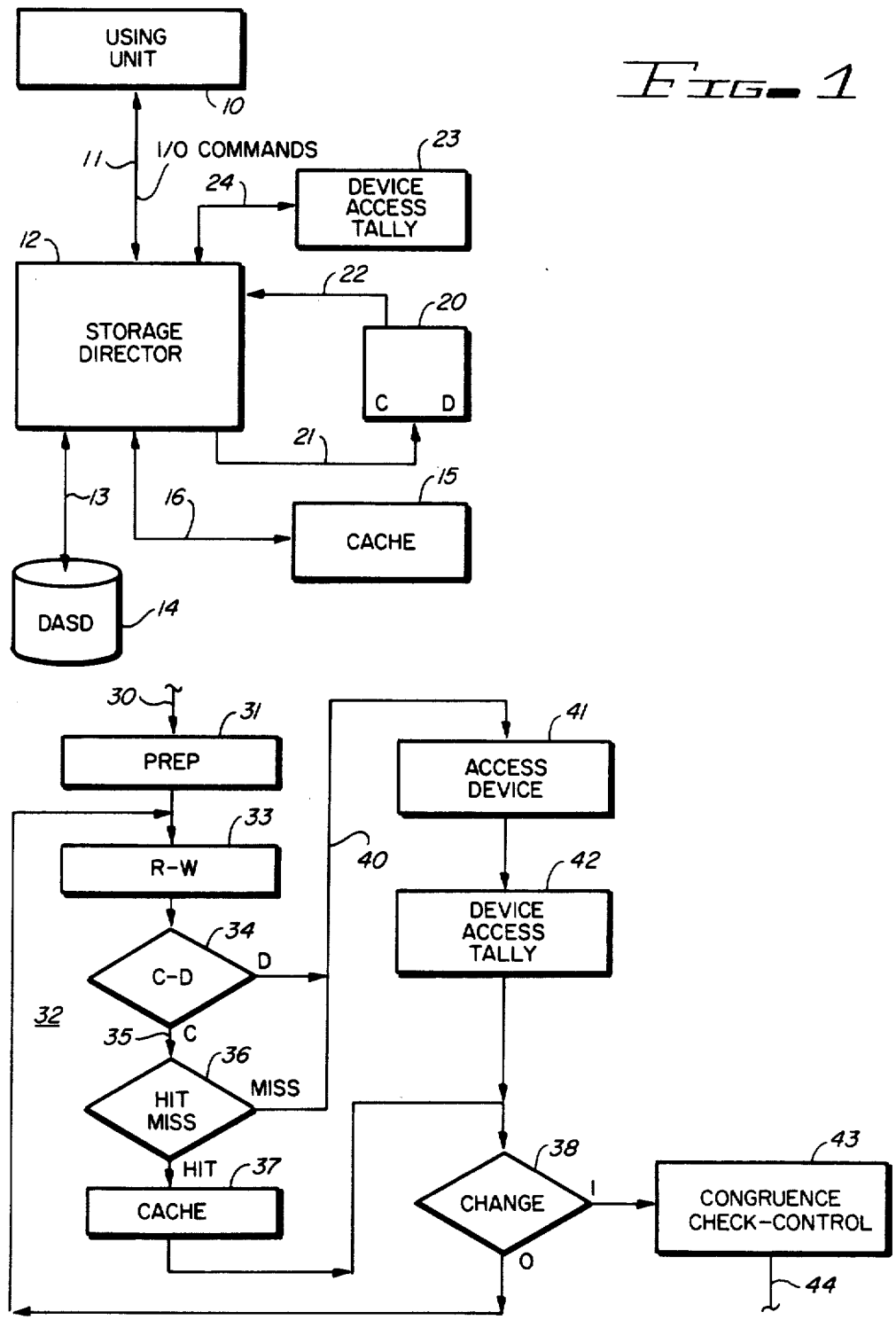
FIG. 1 is a combined logic block and machine operations chart illustrating practicing the present invention in a buffered peripheral system.

Referring now more particularly to the drawing, like numerals indicate like parts and structural features in the various diagrams. A using unit 10, such as a central processing unit (CPU and the like) is connected via a peripheral connection 11 to storage director 12. Storage director 12 includes a programmable processor for operating storage devices which store data for using unit 10. Storage director 12 in turn is connected via device connection 13 to DASD 14. Data is transferred from DASD 14 through storage director 12 to using unit 10 and in the reverse direction, all in accordance with I/O of peripheral commands supplied by using unit 10 over input/output connection 11 to storage director 12. Storage director 12 decodes the received I/O commands and generates a series of device commands transmitted to DASD 14 over device connection 13 using known procedures. One or more DASDs 14 may be connected to storage director 12.

To enhance operation of the just-described storage system, including director 12 and DASD 14, a cache 15 is connected to storage director 12 via memory connection 16. Cache 15 is preferably a high-speed random-access multi-megabyte storage unit addressable as any random access storage unit is addressed. A storage director 12 having independent access to DASD 14 and cache 15 can operate independently with those units. Predetermined data from DASD 14 is promoted to cache 15 for access by using unit 10 in reduced time. In accordance with the invention, operation of the storage system including director 12, cache 15 and DASD 14 is enhanced by a limited bypassing access to cache 15 upon a cache miss. Whenever a given peripheral command requesting data or for supplying data to the system finds that no space in cache 15 is allocated for such data, the remainder of the chain of peripheral commands addressing data within a cylinder of DASD 14 is handled directly between using unit 10, storage director 12 and DASD 14. Such bypass occurs even though space may be allocated in cache 15 for data referred to by the peripheral commands. An advantage of this arrangement is that orientation of DASD 14 with respect to operations of using unit 10 is maintained.

A cylinder of data in DASD 14 is defined in accordance with the International Standards Organization as data contained in a set of tracks all residing within the same nominal distance from the rotational axis of a DASD. A cylinder is also defined as all of the record tracks in a disk storage device, such as a DASD, that are accessible without repositioning the DASD 14 transducer access mechanism (not shown, but as described in U.S. Pat. No. 3,503,060); i.e., all of the tracks that can be accessed as a group through electronic switching.

Data integrity requires congruence between data stored in cache 15 and data stored in DASD 14. Storage director 12 includes a flag bit or flip-flop 20 indicating for each DASD 14 whether or not access to the data is to be achieved through cache 15 or directly to DASD 14. When bit 20 is set to C, cache 15 is accessed; when bit 20 is set to D, then DASD 14 is accessed. Upon a miss, i.e., data being written to the peripheral system or to be retrieved from the peripheral system is not in cache 15, storage director 12 supplies a signal over bus 21 setting bit 20 to the D state. Upon certain other conditions, as will become apparent, but 20 is set to the C state. The memorized state of bit 20 is supplied to storage director 12 controls via line 22. Accordingly, when using unit 10 requests data from the peripheral system, storage director 12 after decoding the command, examines bit 20 for the addressed DASD 14. If the value is C, then a directory, later described, is searched for cache space allocations; if space is allocated in cache 15, the data transfer occurs directly with cache, avoiding accessing DASD 14. On the other hand, when bit 20 is in the D state, DASD 14 is accessed. The present invention relates to certain controls for controlling bit 20 for enhancing data integrity and performance, as will become apparent.

When cache 15 is being bypassed during a write operation, there is a possibility that data in DASD 14 is more current or more recent than the data stored in cache 15, i.e., there is no longer congruence between the data in cache 15 and that in DASD 14. To help reduce this problem, during such direct accesses to DASD 14, storage director 12 provides a device access tally 23, a data processing table accessed via bus 24. This table identifies each track updated in DASD 14 in the direct mode. i.e., when bit 20 is D; and the fact that a DASD 14 track was updated is noted in device access tally 23. Upon completion of a peripheral chain of commands, a series of commands; the device access tally 23 is accessed via bus 24 and compared with entries of data stored in cache 15 in a later described directory. For all comparisons, i.e., for all tracks changed in DASD 14 that have space allocated in cache 15, are then handled in accordance with one aspect of the invnetion. For tracks or records bound to cache 15 that were altered in DASD 14, a replication of the data stored in DASD 14 is moved to cache 15, i.e., is promoted to cache 15; for all tracks or records that are not bound to cache and modified on DASD 14, are erased from cache 15 by destroying addressability, i.e., the entry for such cached data in the later described directory is erased.

The machine operations chart for implementing the invention in the illustrated system through a programmed processor, which typically includes a control store, includes starting a data storage access by receiving a command from using unit 10. Following decoding the command as at 30, certain preparatory commands are received at 31 for priming the peripheral system to receive data transfer commands. In the illustrated storage apparatus these preparatory commands include a SEEK command which causes the access transducer mechanism to move to an addressed track and commands to select an addressed DASD 14. Following such known preparatory steps, loop 32 of data processing operations is performed. The first step in loop 32 is to receive peripheral commands at 33 for commanding a DASD search followed by either a read R or a write W data transfer operation. At 34, storage director 12 examines bit 20 to see whether or not cache 15 or the addressed DASD 14 is to be accessed. Normally, for performance reasons, cache 15 is desired to be accessed; then logic path 35 is followed to step 36 which examines the later described directory to determine if space is allocated in cache 15 for the data in the commanded transfer. Assuming that such space is allocated, a so-called "hit" occurs. Then at 37, cache 15 is accessed and the data processing operation ensues. Upon completion of that operation, storage director 12 at 38 examines system status to determine if there has been a change in operations. A change can be indicated by the end of chain signal as commonly used on computers manufactured by International Business Machines Corporation. Such end of chain is indicated by removing a so-called SUPPRESS OUT tag signal when another tag signal "SERVICE OUT" is active at final status in time, i.e., upon completion of command execution. Another change in operation which includes a SEEK command, i.e., a commanded movement of the transducer access mechanism; an end of cylinder indication which also requires a movement of the transducer access mechanism; and the like indicates a change of accessing from electronic switching between transducers to a mechanical motion of the access mechanism. With addressing tracks in the cylinder and within a chain of command, no change of operation requiring access mechanism motion occurs. Then peripheral system receives an additional read/write command as indicated at 33 for repeating the loop 32 of operations. A plurality of such commands can be executed directly with cache 15 for either reading or writing.

DASD 14 is only accessed when bit 20 is set to the D state as sensed at 34 or a cache miss occurs at 36, i.e., no space is allocated in cache 15. In that event, storage director 12 follows logic path 40 to access DASD 14 at 41. This access, of course, includes transferring data either to a DASD 14 or to using unit 10. Upon completion of the access for a write operation, i.e., transfer of data to a DASD 14, at 42 the storage director 12 updates device access tally 23 for use upon detection of a change at 38; for a read operation no action occurs, but as an alternate embodiment read accesses can be tallied either separately or with the write tally to achieve the purpose of the present invention. Upon detection of a change at 38, storage director 12 at 43 performs a congruence check and control, as later detailed. Such congruence check compares the device access tally 23 with a later described directory for cache 15 for determining any writes to DASD 14 that create noncongruence. Upon completion of this later described operation, storage director 12 at 44 returns to receive additional peripheral commands which may be within the same chain of commands or be a separate chain of commands.

Figure 2:
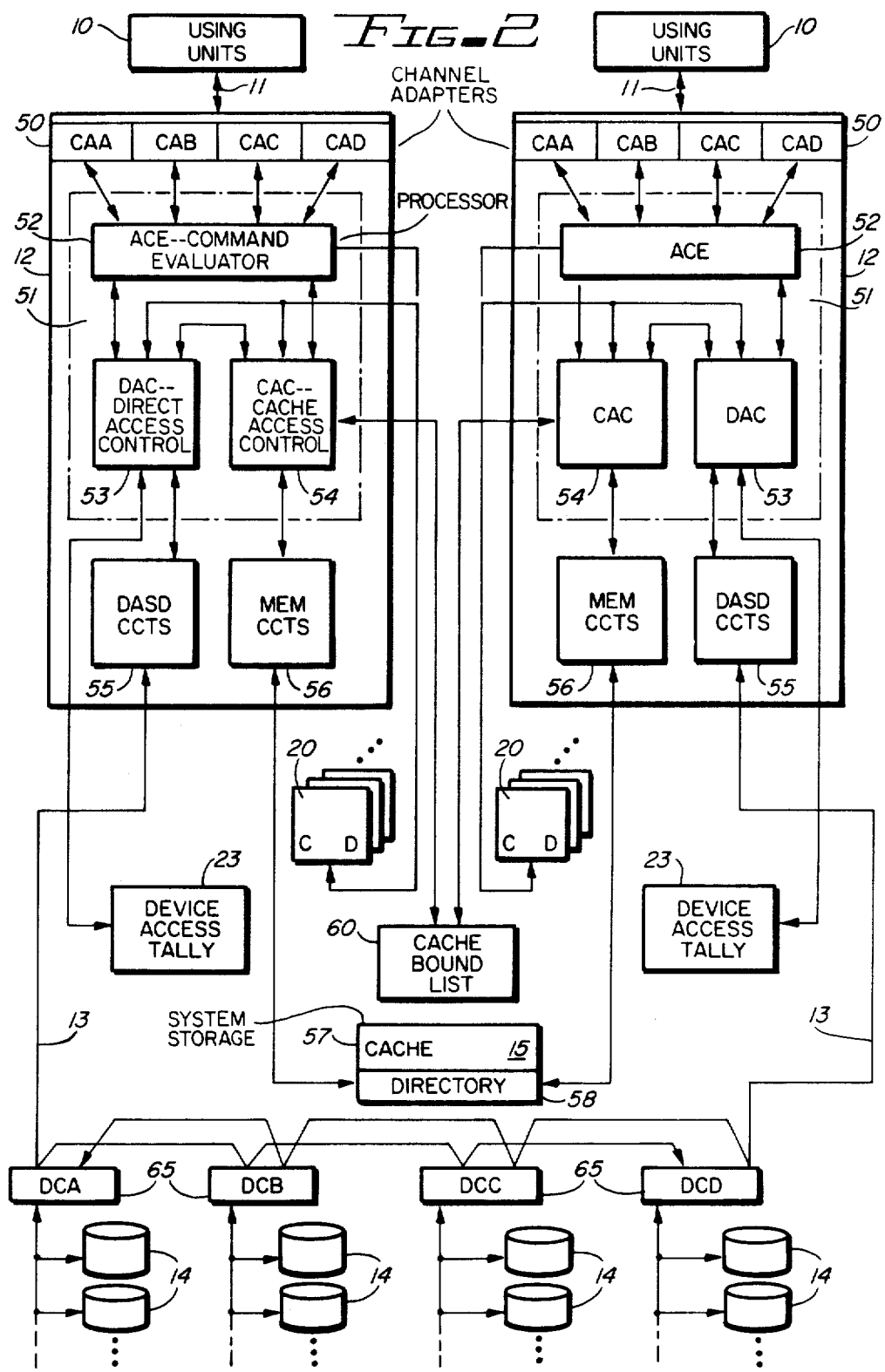
FIG. 2 is a block diagram of a buffered peripheral system employing the present invention, as shown in FIG. 1.

FIG. 2 illustrates a preferred embodiment of the invention as employed in a two storage director 12 arrangement. Each storage director 12 includes a plurality of so-called channel adaptors (external means) 50, also separately denominated as CAA through CAD which connect the respective storage directors 12 to a plurality of using units 10 via a plurality of input/output connections 11. Each storage director 12 includes a programmed processor 51 which as usual includes a processing unit (not shown) having a control store (not shown) which contains computer programs for performing the storage director functions. The programmed processor 51 includes programs constituting address and command evaluator ACE 52 which receive and evaluate peripheral commands. Such functions are also performed in present day storage directors for noncached DASD as widely sold throughout the world. The programmed processor 51 also includes direct access control 53 which responds to commands evaluated and decoded by ACE 52 to control data transfers between using units 10 and addressed ones of DASD 14, as well as providing device commands to DASD 14 for performing well known DASD access and control functions. Program processor 51 further includes CAC 54 which is a cache access control for accessing cache 15. CD bits 20 for each of the DASDs 14 are accessed by DAC 53 and CAC 54 respectively for determining whether to access cache or DASD and for setting the bits to D at a cache miss. Connections from storage director 12 to DASD 14 are via DASD circuits 55 which are constructed using known device adaptor and data flow design techniques. Cache 15 is accessed via memory circuits 56 which includes those circuits for generating addresses and access requests. Cache 15 is a portion of a large random access store 57, hereinafter referred to as a system store. A directory 58 for cache 15 is also stored in system store 57. The directory 58 is accessed using known hashing techniques based upon the address structure of DASD 14. Each unit of data, track or record stored in cache 15 has an entry in directory 58, as is known in the data processing art. Additionally, using unit 10 can command the storage directors 12 to keep data in cache, i.e., pin or bind the data to cache 15. For all bound tracks and records a cache bound list 60, stored within directory 58 but shown separately for clarity, indicates to both storage directors 12 which data stored in cache 15 is to remain in cache 15. This bound list is used in the congruence check and control step 43, as detailed later with respect to FIG. 3. Each storage director 12 has its own device access tally 23.

Access to DASDs 14 is via a so-called string arrangement in which a plurality of DASDs 14 are connected to the storage directors 12 via controllers 65, separately denominated as DCA through DCD. Each storage director 12 connects to the controllers 65 via a daisy-chain device connection 13. A radial connection of known design may also be employed. The operation of the FIG. 2 illustrated system in accordance with the invention is best understood by referring to FIG. 3, a machine operations chart.

Programmed processor 51 at 70 receives a storage access request. This request is decoded and evaluated in ACE 52 using known techniques. At 71, programmed processor 51 DAC 53 portion examines DC bit 20 to determine whether cache 15 or DASD 14 is to be accessed. For a cache C access, processor 51 searches directory 58 at 72 to see if the track or record requested in the received I/O command is stored in cache 15. Searching directories for determining contents of cache or other memories is well known and not detailed for that reason. In this regard, it is noted that some commands will require a direct connection to DASD 14. Accordingly, ACE 52 in detecting such a peripheral command will set bit 20 for the addressed DASD to the direct mode. An example of such a peripheral command is to recalibrate DASD 14. Searches and SEARCH ID EQUAL commands can be performed for cache within directory 72 or within cache 15, i.e., the commands are performed in a virtual manner not involving DASD 14. In the constructed embodiment directory 58 did not separately identify records in a track; only tracks were identified, no limitation thereto intended. Upon completion of the directory search, programmed processor 51 at 73 determines whether or not a hit has occurred. If a hit has occurred, which is preferred for performance reasons, programmed processor 51 follows logic path 75 to access cache 74 for transferring data between using unit 10 and cache 15 using known data transfer techniques. Upon completion of that transfer, programmed processor 51 returns through logic path 85 for receiving a next peripheral command using known techniques. Then a second storage access request is received at 70 for repeating the above described operation for cache 15 accessing.

When a cache miss occurs at 73, the direct mode of data transfer is set at 76. This means that using unit 10 will transfer data directly with DASD 14 within the cylinder of tracks and for the continuation of the particular chain of commands independent of whether or not space is allocated in cache 15 for any of the data transfers. Once bit 20 for the addressed device is set to the direct state, any subsequently received commands following step 70 cause programmed processor 50 to follow logic path 77 to join the exit of step 76 for accessing DASD 14 and tallying the access for write commands at 78 (no tallying for read commands, no limitation thereto intended). Accessing DASD 14 for data transfers, then updating a least recently used linked list for cache replacement control, is well known and not detailed for that reason. The address of the track/record to be written in the addressed DASD 14 for each write operation is stored in device access tally 23 for later described postchain/postcylinder operations. Upon completion of the command execution, by executing step 78, programmed processor 51 reports final status at 79 to using unit 10.

Figure 3:
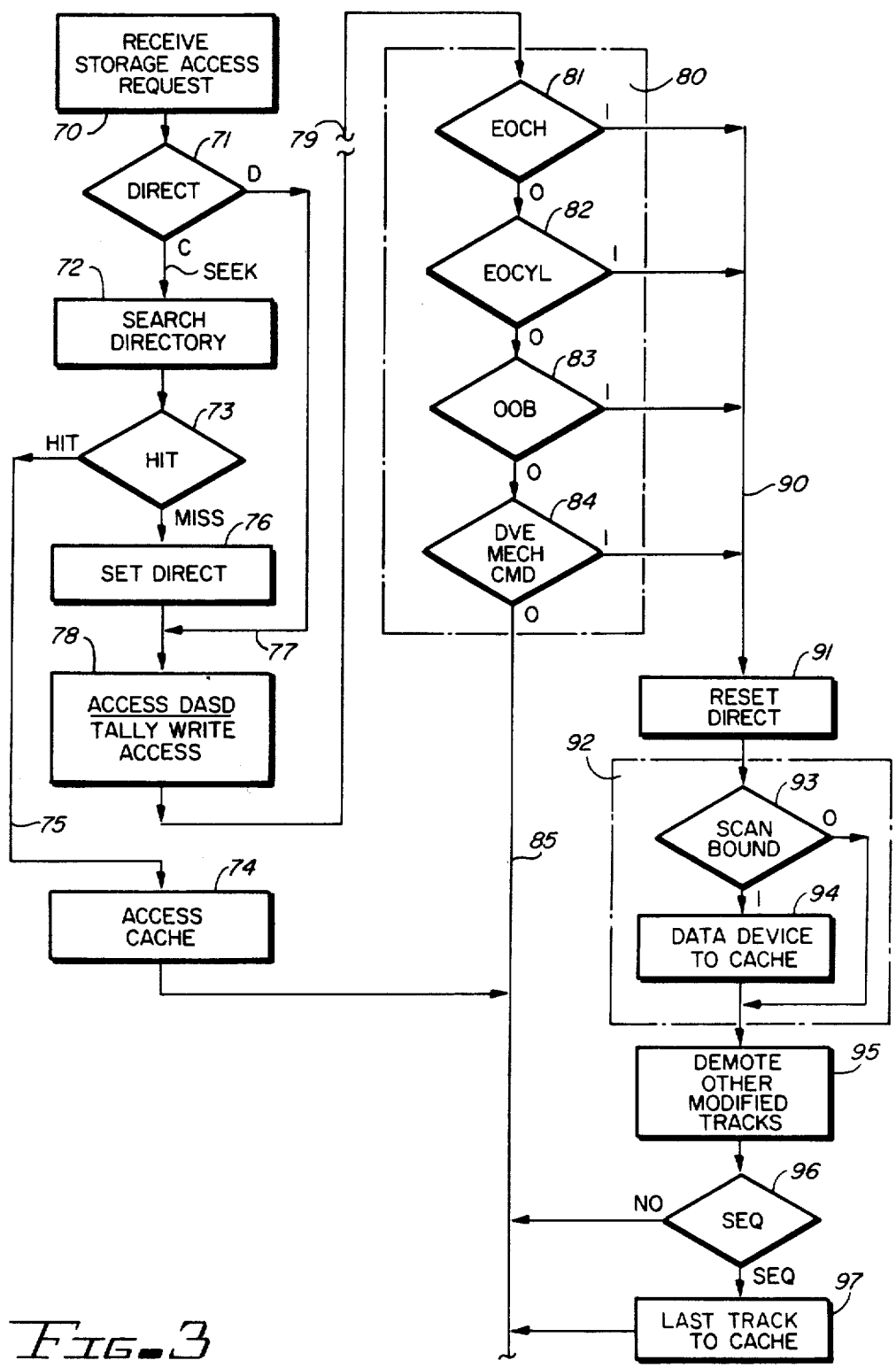
FIG. 3 is a machine operations chart illustrating the operation of the invention in the FIG. 2 illustrated buffered peripheral system.

Upon posting final status, programmed processor 51 then determines whether or not there is a change in operations as detected at step 38 of FIG. 1 and as detected within a series of branch operations 80 of FIG. 3. These checks may be performed upon sending final status to using unit 10 or upon receiving a next peripheral command but before execution of such next peripheral command. A first check at 81 checks for end of the chain (EOCH) which is detected by the absence of the SUPPRESS OUT tag signal at final status time. The second check at 82 is for the-end of the cylinder (EOCYL). All of the tracks within a cylinder have a predetermined address space, tracks 1 through 17, for example. Depending upon the addressing increment direction, i.e., increasing or decreasing track addresses, upon completion of an access to a track at 78, the next track can be in an adjacent cylinder or within the same cylinder. If the next track to be accessed is expected to be in an adjacent cylinder, then at 82 programmed processor 51 indicates end of cylinder, a change indicated in step 38. The third check at 83 is for out of bounds (OOB). It is common practice in present day DASD peripheral systems to have a DEFINE EXTENT command received from a using unit 10. A DEFINE EXTENT command establishes a range of addresses which defines bounds of permitted access. Accordingly, if programmed processor 51 in processing the peripheral command at 78 indicates that the address being processed is at the boundary of the defined extent; then an out of bounds condition occurs, i.e., the next desired access will be outside of the previously defined extent, i.e., a change in operation. A fourth check at 84 is for a received command decoded by step 70 which is a device related command. This type of command includes the RECALIBRATE command as used on present day DASD.

If all of the steps 81-84 indicates no such change, then programmed processor 51 follows path 85 to receive the next peripheral command. If any one of the conditions set forth for steps 81-84 are met, then programmed processor 51 follows logic path 90 to reset bit 20 to the C state at step 91. Then at 92 program processor 51 in step 93 scans cache bound list 60 and compares each entry in cache bound list with the contents of device access tally 42. For each hit, i.e., favorable comparisons, programmed processor 51 actuates the peripheral system to transfer data from DASD 14 to cache 15 corresponding to that data, i.e., data stored in a track on DASD 14 was changed when data contained in cache 15 was bound to that cache. For congruence and data integrity cache 15 is updated. At completion of the scan or no hit, step 94 is omitted. At 95, the tracks on DASD 14 which were modified and not bound to cache 15 are demoted from cache 15. At 96, programmed processor 51 examines a sequential bit (not shown) to see whether or not a using unit 10 had indicated that the previous storage requests were indicated as being sequential data, i.e., the using unit 10 is using the data in the batch mode such that sequential processing occurs as opposed to interactive modes where partitioned data sets or random accesses to the data occur. If the data are not sequential, then programmed processor 51 goes to logic path 85. For sequential, data programmed processor 51 at 97 promotes the entire contents of the last track accessed in the DASD 14 to cache 15. This occurs of read operations. For purposes of brevity the sequential indicator is not shown in the drawing, but it is a bit in a control store (not shown) of programmed processor 51 for each of the addressed DASD 14.

In the above described operation, accessing DASD 14 ensures recording data from using unit 10 into the retentive store of DASD 14 as quickly as possible thereby avoiding transferring the data to cache and then from cache to DASD 14 whenever orientation of the DASD 14 has been established and whenever allocation is required in cache 15. Practicing this invention in a test environment has shown that this has protected data integrity while enhancing performance of the peripheral storage system.

While the invention has been particularly shown and described with reference to preferred embodiments thereof, it will be understood by those skilled in the art that various changes in form and details may be made therein without departing from the spirit and scope of the invention.

What is claimed is:

1. The method of operating a buffered peripheral system having a plurality of peripheral devices connected to and sharing a random-access data buffer, directory means for indicating whether data stored or to be stored in a one of said peripheral devices has data storage spaced allocated therefor in said data buffer, data transfer means connected to said data buffer and to said peripheral devices for transferring data therewith and with external means external to said buffered peripheral system;

the improvement including the steps of:

initiating a data transfer for transferring a record of data, by addressing a given one of said peripheral devices, between said buffered peripheral system and said data transfer means by first examining said directory means to ascertain whether said data buffer has data storage spaced allocated relating to said data transfer being initiated, if said data storage space is allocated, performing said data transfer between said buffer and said data transfer means; if said data buffer has no data storage space allocated for said data transfer, bypassing said data buffer and directly transferring data with said given one peripheral device; and then transferring in a respective series of data transfers a series of records of data between said data transfer means and said given one of said peripheral devices without examining said directory means such that said series for data transfers occurs with said given one of said peripheral devices irrespective of said data storage space allocations in said data buffer.

2. The method set forth in claim 1 further including the steps of:

detecting an access delay boundary in said given peripheral device intermediate two successive ones of said data transfers in said series of data transfers, then examining said directory means for data storage space allocation in said data buffer relating to a next successive one of said data transfers following said access delay boundary, if the last-mentioned directory examination shows an allocation for said next successive data transfer, then repeating the steps set forth in claim 1; otherwise, when the last-mentioned directory examination shows no allocation for said next successive data transfers, then continue said data buffer bypassing step for succeeding data transfers.

3. The method set forth in claim 1 or 2, further including the steps of:
    completing said series of data transfers and indicating all write operations that modified data stored in said peripheral devices; and
    invalidating corresponding but unmodified data stored in said data buffer.

4. The method set forth in claim 1 further including continuing said series of data transfers directly with said given one peripheral device until said external means sends a device-related peripheral command to said buffered peripheral system which requires said buffered peripheral system to access the addressed device to order it to perform predetermined operations irrespective of the data contents of said data buffer, then on any subsequent data transfer reexamining said directory means for storage space allocated in said data buffer.

5. The method set forth in claim 1 wherein said peripheral devices are disk data-storage apparatus each of which have a plurality of record surfaces with radially movable transducer means with all axially aligned record tracks in said surfaces being a cylinder of such tracks;
    further including the steps of:
    continuing said series of data transfers directly with said given one peripheral device within a first cylinder of said record tracks; and
    upon accessing a second cylinder of said record tracks, reexamining said directory means for storage space allocated in said data buffer.

6. The method set forth in claim 1 further including the steps of:
    continuing said series of data transfers directly with said given one peripheral device;
    receiving an indication from said external means that said series is complete; and
    upon any next data storage access to said given one peripheral device reexamining said directory means for space allocated in said data buffer.

7. The method set forth in claim 1 further including the steps of:
    establishing a range of addresses in said given one peripheral device;
    receiving a data storage address from said external means indicating a record storage area in said given one peripheral device to be accessed for each data transfer in said series of data transfers; and
    continuing said series of data transfers directly with said given one peripheral device until a received one of said received data storage addresses is outside said range of addresses; then reexamining said directory means for storage space allocated in said data buffer.

8. The method set forth in claim 1, 2, 4, 5, 6 or 7, including the steps of:
    receiving read requests from said external means for initiating data transfers from said given one peripheral device to said external means via said data transfer means; and
    initiating said read requested data transfers and transferring said data in a series of data transfers from said given one peripheral device to said external means.

9. The method set forth in claim 1, 2, 4, 5, 6 or 7, including the steps of:
    receiving write requests from said external means for initiating data transfers of write requested data to said given one peripheral device from said external means via said data transfer means; and
    initiating said write requested data transfers and transferring said data in a series of data transfers to said given one peripheral device from said external means.

10. The method set forth in claim 9 including:
    receiving from said external means an indication that predetermined data stored in said data buffer is bound to said data buffer;
    completing said series of write data transfers; and
    for each write data transfer in said series of data transfers made directly to a data storage area in said given one peripheral device containing data not bound to said data buffer, removing corresponding data from said data buffer; and
    for each said write data transfer to a data storage area in said given one peripheral device storing data indicated as bound to said data buffer, then transferring all such written data from said given one peripheral device to said data buffer for updating the data stored therein corresponding to data transferred in said each write data transfer.

11. The method set forth in claim 10 further including the steps of:
    receiving an indication from said external means that said write requested data is being transferred in said series of data transfers; and
    upon completing said series of data transfers, transferring the data content of the last data storage area accessed in said series of data transfers in said given one peripheral device to said data buffer.

12. The method of operating a data storage hierarchy having a backing store and a caching buffer store with means to store data in said buffer store based upon addressable data storage areas of said backing store, both of said stores having a plurality of addressable data storage areas;
    including the steps of:
    in a series of data transfers, wherein each of said data transfers transferring a record of data, transferring data from an external means to said backing store to the exclusion of said buffer store said external means being external to said data storage hierarchy and connected to said backing and buffer stores and to said means to store;
    receiving from said external means an indication that data transferred in said series of data transfers is host sequentially processable data;
    upon completion of said series of data transfers determining whether said buffer store is storing data corresponding to data stored in said backing store during said series of data transfers;
    effectively removing said corresponding data from said buffer store; and
    also upon completion of said series of data transfers, transferring the data contents of the last data storage area accessed, during said series of data transfers, to said buffer store.

13. The method of operating a data storage hierarchy having a backing store and a caching buffer store with means to store data in said buffer store based upon addressable data storage areas of said backing store, both of said stores having a plurality of addressable data storage areas;
    including the steps of:

receiving an indication from said external means that predetermined data stored in said data buffer is bound to said data buffer;

in a series of data transfers, wherein each of said data transfers transferring a record of data, transferring data from an external means to said backing store to the exclusion of said buffer store said external means being external to said data storage hierarchy and connected to said backing and buffer stores and to said means to store;

upon completion of said series of data transfers determining whether said buffer store is storing data corresponding to data stored in said backing store during said series of data transfers;

when said corresponding data stored in said data buffer includes predetermined data, updating said predetermined data by transferring data stored in said backing store corresponding to said predetermined data received from said external means and associatable by addresses of said addressable data storage areas of said backing store with said predetermined data stored in said data buffer during said series of data transfers whereby congruence of supposedly identical data stored in said buffer store and in said backing store is maintained; and effectively removing said corresponding data which is not said predetermined data from said buffer store.

14. The method set forth in claim 13, further including the steps of:

receiving from said external means an indication that data transferred in said series of data transfers is host sequentially processable data; and upon completion of said series of data transfers, transferring the data contents of the last data storage area accessed during said series of data transfers in said given one peripheral device data to said buffer store.

15. In a buffered peripheral system having a plurality of addressable peripheral devices connected to and sharing a random-access data buffer having a plurality of addressable and allocatable data storage spaces and being connected to an external means for transferring data between said external means and said peripheral devices, directory means operatively connected to said data buffer for indicating whether data storable in a one of said peripheral devices has space allocated in said data buffer;

the improvement including the steps of, in combination:

initiating a data transfer of a record of data between said buffered peripheral system and said external means by first examining said directory means to ascertain whether said data buffer has any of said data storage space allocated relating to said data transfer being initiated, if said data storage space is allocated, performing said data transfer between said data buffer and said external means;

if said data buffer has no data storage space allocated for said data transfer, bypassing said data buffer to transfer data between a one of said peripheral devices and said external means;

then transferring a series of records of data in a series of said data transfers with said peripheral devices external means without examining said directory means such that said series of data transfers occur with said peripheral devices irrespective of said space allocations in said data buffer; and detecting an access boundary in said one of said peripheral devices intermediate two successive ones of said data transfers in said series of data transfers, then examining said directory means for space allocation relating to a next successive one of said data transfers following said access boundary.

16. In a data storage hierarchy adapted to be connected to using units, comprising:

a cache store for addressably storing data;

a backing store for addressably storing data in respective addressable data storage areas, and connected to said cache store and means for transferring data between the backing store and said cache store;

switching means for selectively switching communication paths between said using units, said backing store, and said cache;

transfer means for transferring data between said using units and either said cache store or said backing store in a series of data transfers, each data transfer transferring a record of data;

directory means for addressably indicating data stored in said cache store as it relates to addressable data storage areas of said backing store;

device access tally means being responsive to transfer of data between said backing store and said using units to memorize addresses of data stored in said backing store received as changed data from a using unit but not stored in said cache store; and congruence means responsive to a completion of said series of data transfers to examine said directory means and said access tally means to identify changes in data content in said backing store not occurring during said series of data transfers in data stored in said cache store corresponding to said changed data content and including first means for deleting first predetermined portions of said corresponding data stored in said cache store, second means for updating second predetermined portions of said corresponding data stored in said cache store by activating said switching means for transferring said data stored in said backing store associatable by addresses of said backing store with said second predetermined portions of said corresponding data stored in said cache store.

* * * * *